(12) United States Patent
Watkins

(10) Patent No.: US 8,464,934 B2
(45) Date of Patent: Jun. 18, 2013

(54) METHOD AND SYSTEM FOR PURCHASING GOODS AND SERVICES FOR A GROUP OF INDIVIDUALS THROUGH A COMMUNICATION NETWORK

(75) Inventor: David Anthony Watkins, Brooklyn, NY (US)

(73) Assignee: Mark Phillip Watkins, Highlands Ranch, CO (US)

( * ) Notice: Subject to any disclaimer, the term of this patent is extended or adjusted under 35 U.S.C. 154(b) by 551 days.

(21) Appl. No.: 13/138,521

(22) PCT Filed: Apr. 17, 2007

(86) PCT No.: PCT/US2007/009304
§ 371 (c)(1),
(2), (4) Date: Dec. 12, 2011

(87) PCT Pub. No.: WO2007/127090
PCT Pub. Date: Nov. 8, 2007

(65) Prior Publication Data
US 2012/0078750 A1    Mar. 29, 2012

Related U.S. Application Data

(60) Provisional application No. 60/794,940, filed on Apr. 26, 2006.

(51) Int. Cl.
*G06K 5/00* (2006.01)
(52) U.S. Cl.
USPC .......................................... 235/379; 235/380
(58) Field of Classification Search
USPC ..................................... 235/380, 379; 705/27
See application file for complete search history.

(56) References Cited

U.S. PATENT DOCUMENTS

| 6,575,361 | B1 * | 6/2003 | Graves et al. | 235/380 |
| 7,866,548 | B2 * | 1/2011 | Reed et al. | 235/380 |
| 7,889,052 | B2 * | 2/2011 | Berardi et al. | 340/5.8 |
| 2009/0228372 | A1 * | 9/2009 | Jooste et al. | 705/27 |

* cited by examiner

*Primary Examiner* — Daniel Hess

(57) ABSTRACT

Allowing users to organize financial resources, it is one object of the present invention to provide a ticket vending and purchasing system for preventing illegal activities, such as ticket scalping, and for ensuring the price determiner is able to exercise their right to setting the price for events. A group purchasing method and system using the Internet is provided. Members of a group register for an event and provide a method of individual payment. A following permission to allow purchase by a system defined agent allows a single agent to purchase the group package for all registered members. The system uses each person's payment information and not only a single user's.

17 Claims, No Drawings

METHOD AND SYSTEM FOR PURCHASING GOODS AND SERVICES FOR A GROUP OF INDIVIDUALS THROUGH A COMMUNICATION NETWORK

This patent claims priority from application No. 60/794,940 filed on Apr. 26, 2006 by the inventor David Anthony Watkins.

FIELD OF INVENTION

This invention generally relates to a method and system for a group purchase of an event using a computer system or computer network, specifically to an improved method of billing involving all members in an event.

PRIOR ART

The current systems for event billing are cumbersome due to the inability of the systems to let users organize event payments with all members in a group, using a method which lets all users pay while letting a group leader initialize a payment transfer.

The Internet's ability to capture users' wants and desires allows for the feasibility an ease of use of the invention. As a medium for the gathering of ideas and the storage of information, the invention takes full advantage of the Internet's capabilities.

The purchasing of tickets for a popular exhibition often involves excessive labor on the part of the purchasers, who are forced to queue up at sales counters for many days, or must place repeated telephone calls to secure reservations. Furthermore, when tickets to a popular event are in short supply, the so-called scalping of tickets becomes a problem. The scalpers who engage in this activity, which is generally illegal and regulated by law, take advantage of the relative rarity of eagerly sought-after tickets to charge consumer prices that are much higher than those at which the tickets originally sold.

Promoters, artists, or managing entities try to ensure no scalper should profit from such situations as a good will gesture towards the patrons who wish to attend their events, and in any case, illegal activities such as scalping impose an excessive load on purchasers that they should not have to bear.

Lastly, ticketing services such as Ticketmaster are very restrictive on the quantity of tickets an individual may purchase. Thus, for a group of more than eight persons, the assignment of tickets may be such that the users do not get to enjoy a performance in close proximity to one another. The current ticketing systems do not serve large groups well.

OBJECTS AND ADVANTAGES

Therefore, one object of the present invention is the provision of improved conveniences for ticket purchasers, while removing inconveniences, such as queuing up at a ticket counter for extended times, or making repetitive calls to a ticket agency to obtain tickets.

It is another object of the present invention to provide a system for preventing illegal activities such as ticket scalping, and for eliminating any third party profiteering. The invention allows for a block of tickets to be paid for without worry that the bulk purchase will be used for improper behavior. The current state of the art places restrictions on users regarding the number of tickets available for purchase by a single user, the belief being that the user may try to scalp all or any excess tickets resulting in a third party profit that the system is not intended for.

The invention allows a group of individuals to register for an event such as a concert, ensuring that the tickets are already allocated to a user with the intention of using the ticket for its intended purpose. The invention ties each individual user of a group, using account data, or an id, to the user's preferred method of payment, thus deterring a user with intent to use a single payment method for an excessive purchase of tickets. Furthermore, the invention could allow for other tickets to be purchased under a "gift" categorization as long as a given number of tickets are tied to a single method of payment. Nevertheless, a group is not punished by having the ability to coordinate a large bulk purchase even if not all tickets are tied to group members.

It is a further object of the present invention to provide a system and method for providing maximum non-financial profits such as good will and loyalty from the consumer to a promoter, performer, or a ticket vendor. Whenever users pay a fair price for tickets, the users appreciate the service provider providing and securing the service more than companies who let their products and services become subjected to third party profiteering.

It is an additional object of the present invention to provide a system and method for selling a group package that reflects the desires and uses the financial resources of all members in a group. A further object of the present invention is to provide, at the time of purchase authorization, an allocation of event related resources ensuring that group members can both share the convenience of close geographic proximity and the interactive sharing of event details with others in the group. By letting group members share details and resources, a service provider is better able to service group members by ensuring a group receive tickets in close proximity. Furthermore, by using the details and resources of a group, a service provider can better manage their services beforehand by preparing group packages instead of trying to manage each user's experience individually.

Another object of the invention is to let a group either elect an authorized entity or allow any group user to initiate the purchase of a group event. For example, in situations where tickets are awarded on a first-come, first-serve method, it would be useful if only a single person had to wait in line or make a phone call after the tickets sales begin. The invention reflects this object. Moreover, an advantage of the invention is that while the user is able to initiate the purchase for a number of tickets, the single user need not be responsible for total payment of a group event.

The invention is also a tool for content producers to market and create events around their content. The invention solicits a user group's preferences. Using these guidelines and parameters, the content provider can cater to the group's desired experience. For example, for a concert, the group could determine a musical group's play list as well as food and beverage wished to be consumed during the event.

Furthermore, goods and services could be user group driven. For example, groceries not offered or typically ordered by a retailer could find a place on the retailer's virtual shelf because so many users in a single group desire the product. Thus, users would join a group called "Organic Peanut Butter" and having provided payment information, the invention would transfer payment from all users once a given threshold such as 100 users joined.

For digital services, such as downloaded video content, the invention is a tool to transfer distribution cost, physical storage, and physical inventory to the group users. For example, group users in a DVD club could be each responsible for the downloading of different titles of DVDs as well as burning DVDs for each of the group members. The service provider would simply charge each user for a group of titles and individual group members could determine who would be responsible for downloading, burning, and distributing individual titles.

Furthermore, groups could be formed for Book Clubs, Movie Clubs, Concert Clubs, and Music Clubs. All members would agree on a per individual cost and the service provider could allow for a group to use a check in, check out model or the service provider could provide for simultaneous streams or simultaneous downloads.

Further objects and advantages will become apparent from a consideration of the ensuing descriptions.

SUMMARY

The schematic configuration of the present invention will now be described. According to the present invention, an event group purchasing method and system using the Internet is provided. A user registers to a group event, the group event having been previously been built by the system, by a single member, or by more than one members in the group.

The users all sign up to the built event through a communication network. By registering to the group event, the user agrees to payment authorization and a deferment for the system or another individual to complete the transaction. The system can either then hold payment, receive payment, or allocate payment in an account until the system is ready to procure a paid or non paid reservation for goods and services.

At the time when the system is ready to accept reservations, an action is required to move all group members' funds into the service(s) provider(s) paid account(s). Group discounts are applied at this moment due to verification of group members in good standing and a concrete number of participants. Different discounts are provided based on variable quantities of goods and services that group members share. This movement of funds can be initiated by the system, an authorized representative of the group or any member of the group.

PREFERRED EMBODIMENT

In the preferred embodiment, the invention is used for ticketing services such as those similar to the company Ticketmaster. The preferred embodiment is also applicable for the awarding of movie tickets to movies that would not be currently on sale but be in high demand. Furthermore, a movie may not even be planned for viewing unless a threshold of group registrants is met that wish to view the movie.

In such scenarios, a group of users hope to be awarded tickets to an event or to a movie that is not currently available for purchase. In both cases, all members in a group may have to stand in line or be responsible for buying his or her ticket. The preferred embodiment is a tool for letting a group of users assemble virtually before assembling at the event for redemption. The virtually assembly gives the system the opportunity to allocate event resources and verify payment of all members before any awarding of tickets.

After the open sale of tickets, should any member be granted access to the system and awarded tickets, a pre-given right to purchase on behalf of the group allows a member to initiate the movement of funds from all members to be used towards the purchase of tickets.

The preferred embodiment facilitates a model for customer driven goods or services. For example, once an event group reaches a certain group member threshold, a musical band would release a CD or play a concert, the musical band having already secured finances for their service.

OPERATION OF PREFERRED EMBODIMENT

The invention involves components of the Internet and communication networks that access or pass information through the Internet. It should be noted that the present invention can be implemented by various other embodiments, and is not limited to the present embodiments of the invention.

In these embodiments, the method and system will manly be described. However, as will be apparent to one having ordinary skill in the art, the present invention can be implemented as a computer-readable program. Thus, the present invention can be provided by hardware, software or a combination of hardware and software, and the program can be recorded on an arbitrary computer-readable storage medium, such as a hard disk, a CD-ROM, a DVD-ROM, an optical storage device or a magnetic storage device.

Further, in the embodiments, a general computer system can be employed. The computer system for this embodiment comprises hardware resources common to average computer systems, i.e. a central processing unit (CPU), a main memory (RAM), a nonvolatile memory (ROM), a co processor, an image accelerator, a cache memory and an input/output controller (I/O). The computer systems further comprises an external memory, such as a hard disk drive, and communications mean that can be connected to a network, such as the Internet. The computer system can be an arbitrary computer, such as a personal computer, a workstation, or a main frame computer.

In this purchasing system, a computer system of an event group member and a server including a service provider's website, are connected to the Internet. The member issues various requests via the Internet to the server, and the server transmits responses via the Internet to the computer system, and an HTTP (Hypertext Transfer Protocol) request, for example, is issued to the server. The server performs various processes, as will be explained below, and transmits, as a response, HTML (Hypertext Markup Language) data or dynamic HTML or XML (Extensible Markup Language) data.

In this embodiment, the Internet is employed; however, the use of the Internet is not always necessary. For example, the computer system and the server may be connected by a special line. The Internet may be an intranet used by a company, and the communications means for the Internet may be either wired or wireless. Lastly, the embodiment could use traditional telephony technology.

The server includes an event group catalogue system detailing the goods and services of an event as well as the group members in each event group. The term event will be used from here on to refer to all goods and services that a ticket encompasses. The event may have been built by several means. A user in an event group may have built the event. The system may have built the event. A representative for the event group may have built the event. A number of members, if not all members, may have been responsible for the building of the event. In each case, the entity responsible for building the event may have used an invitation to bring members into the event group.

The server also comprises a means of transferring funds from the group members to the service provider(s) account (s). The event members could be holding monies ready to be transformed from a credit card, debit account, or prepaid account.

In the present embodiment, any user that is invited to the event group must have an account in order to register for the event. Registering for a group event involves the user first setting up an account with the vendor responsible for managing the event tickets that may be awarded to the users. For example, a company like Ticketmaster represents the artists, the facility, and potential concessions companies. A user would establish an account with Ticketmaster before proceeding to the next step of registering to a built group event. The user could be required to have special permission to access an event group. For example, a built event could be by invitation only. Providing a user has permission to join an event, the user would select the group event, in this case, a concert that s\he wants to be apart of and look over the details for approval of selected goods and services in the concert event. The user would approve the details by sending data such as payment information from their computer system to the server.

The computer system would send information to the server to confirm approval of the event including payment information and the authorization to access the user's money account for the holding of funds. The holding of funds is a necessary precursor before a potential transfer of funds to the service provider(s) control. Each member in the same group would be responsible for giving the approval of authorizing access to their individual monies as a way or registering for the group event. While the financial parameter of ensuring that the user has funds available as a valid registering to a group event is exercised in this embodiment, other parameters to ensure security could also be used, such as methods of authenticating that the member attempting to register to the event group is truly the person intended, or using demographic information to ensure that the user falls within any event restrictions such as age requirements. Furthermore, any member flagged for abuse could be prevented from registering to any event group and existing members of the group could be alerted to such a flag when either initiated by the system or from a fellow group member.

In the preferred embodiment, all users would be needed to register for the system to deem the event group as valid. However, in alternative embodiments, not all users need to register for the event group in order for other users to use the system.

Once registered, users could then use the system to truly be a community of shared resources. For example, prior to the concert, users could load audio and video to their event group profile so other members in their community can listen to songs from the artist before experiencing the songs live at the concert.

Provided that the concert tickets do not go on sale until a couple of weeks after all users have registered for the event, the system could be designed for several implementations. In each of the implementations, a user waits to access the system until the system is available for ticket sales and the confirmation of purchases. A single user in the event group could be "standing by" at the open time of ticket sales to submit his\her event group as a candidate for the purchase of tickets, or all users in the event group could be standing by at the opening of ticket sales to submit their event group as the candidate for the purchase of tickets. Lastly, a designated representative of the group such as the ticket agent could be standing by to submit the event group as the candidate for the purchase of tickets. Due to the competitive nature of the awarding of tickets, the more users standing by from a group increases the likelihood of receiving an offer of tickets.

Any of these implementation towards the awarding of concert tickets could be implemented through existing communications networks including Internet or telephone. After a user(s) gets into the system, the user(s) would submit information about what group they are representing and the system would confirm that either the user is a member of the group or an authorized agent representing the group. Furthermore, if the user is already logged in to the service provider's website, the system could use the login information for group identification. If tickets are still available for all group members, an offer of the tickets would be made to that user(s).

The server would be communicating to the user(s), details of the tickets that were awarded to the group, such as geographic location of the block of seats. Upon approval of the offer by a user, the user would send information back to the server to confirm the purchase of the block of seats. The confirmation would lead the system to reject any other subsequent submissions preventing any other members of the same event group from initiating a redundant purchase or the purchase of tickets with different detail information Moreover, the confirmation would cause the system to transfer the monies currently on hold to the service provider (s) accounts. Thus, the initialization of the movement of funds for all users falls on the first member in the group to confirm the acceptance of the awarding of goods and services to the group. The system uses a "going Dutch" approach to cover the total price of an event and each user pays his or her way.

Subsequent sales of ancillary goods and services would then be individually targeted to group members and treated as separate transactions.

ADDITIONAL EMBODIMENT

In an additional embodiment, the invention is presented for a service provider such as a movie theatre where the system is responsible for assisting an event planner for providing goods and services to a group planning to use the movie theatre for an event such as a private screening.

The event planner would be responsible for gathering the details of an event including concession items, movie selections, and auxiliary equipment needed for the event. Subsequently, the event planner would add member participants to the event.

The event planner would then provide for the event group all of the details of the event through an email or website with an identification code. Event group members would then register themselves to the event by communicating a payment method to the event planner. This could be done electronically or over the phone.

As soon as the last member registers, the event planner would initiate the processing of payment from each of the members into the movie theatre's account, thereby fulfilling each event members' payment responsibility.

OPERATION OF ADDITIONAL EMBODIMENT

A user would contact an event planner regarding the coordination of a private movie screening in a movie theater. After receiving all requirements from the user, the event planner would contact all users for registration to the event.

As each member registers and submits financial information, the system would be holding monies from the user's preferred method of payment. For example, if a user chooses to provide a credit card for method of payment, the system would appropriate funds for that user only and hold the funds as pending, preventing the user from overextending the credit card with subsequent purchases. When the time comes for payment of goods and services, the funds will still be available to move into the service provider's account.

As soon as the last member registers for the group event, the event planner would initiate all monies to be transferred from all accounts into the service provider's account. In this embodiment, after the defined threshold requirement of all members registered, the coordinator is responsible for moving payments from all users' accounts to the service provider's to cover the total price of a private screening. Furthermore, the coordinator could have set a trigger in the system, such as last member to register and after the system determines it is ready to accept confirmations, the system would responsible for initiating the movement of funds instead of a coordinator.

The event planner predetermines the event details and goods and services availability so no user in the group need to be concerned about neither the awarding of goods and services nor date of open sale, simply a registering to the event and the submission of payment information for the event.

ADDITIONAL EMBODIMENT

An additional embodiment entails the sharing of digital media for a simultaneous stream downloaded files, or the storage of intellectual property on their respective websites. The group members would agree to the purchase of a collection of different media and/or to a number of simultaneous streams. For multiple titles, each user could be responsible for a different title to burn and distribute, avoiding the tying up of resources such as bandwidth, computer storage space, and hardware use. A user price incentive could be offered in this embodiment to encourage existing group members to rally other members into the group.

CONCLUSIONS, RAMIFICATIONS, AND SCOPE

The invention involves all members in an event group choosing a convenient method of paying for an event. A user's payment information is accessed by the system to allocate funds towards the payment of a group event. Moreover, the user may not be given registering privileges to a group unless the user has set up access to the user's financial information for the system.

While this may be the only requirement for registering to an event, registration could include other requirements before the ability to register for an event. The system may also require that the user have an account with the system as well: This account could include a user name and password, plus demographic information and other information to verify the user's association with a financial account. This would be another security method to ensure users are not using somebody else's financial information towards the purchases of goods and services.

The invention may also allow a group member to buy a limited amount of tickets on behalf of other members in the group, providing the system can authenticate the other group members or use a security method where the identification of the ticket must match identification to the person for admittance to the event. Thus, an ancillary requirement that does not include a financial parameter could be used for a user to register for an event that s/he will not be paying for. For example, if a group member wanted to buy a ticket for a guest, the group member could update guest information prior to arriving at the concert. Thus, a single payment method is being tied to a user and the user's guest so the credit card holder can buy on behalf of the guest through the submission of user information and user guest information. The user guest ticket could be initially left blank so the ticket is transferable.

The invention could involve many thresholds to determine how payment is initiated for all members. For example, as soon as a system set threshold on number of registered members agreeing on details of the event, a representative such as travel agent could initiate a confirmation, and monies could then be transferred from all accounts into the service provider (s) account. In the various embodiments, the system can be defined differently using different threshold requirement to initiate payment from all users. Moreover, a separate definition would determine who or what actually initiates the moving of payments from all users' accounts to the service provider(s) to cover the total price of an event.

The scope of the invention could extend not only to musical concerts or movie events, but to group auctions or group reverse auctions. A single user of the system accepts a price offer at a given threshold on behalf of everyone in the group and the system would be charged with collection of monies from everyone in the group.

Lastly, thresholds could be relevant to offer products at a group discount. For example, a good or service could be offered at $5.00 for 15 people. Thus, the last member to register, in this case number 15, could be responsible for initializing payment or the registering of the last member could cause the system to initiate payment.

The threshold could be changed and the goal could be to assemble as many group registrants as possible and based on how many group members there are by a given date, a group discount would be applied to that number. This utilization would be a very cost effective means of using group dynamics and word of mouth to market a product.

What is claimed is:

1. A method and system for purchasing goods and services in a variable time horizon through a remotely extendable, multi-user communications network comprising:

(a) authenticating and authorizing means to access a plurality of online users' accounts for preparing a plurality of individual contributions of funds to a shared aggregate group threshold said access selected from the group comprising of user submission of financial data, authorized proxy's submission of financial data, said authorized proxy having been authorized by the user, user submission of authorization data for a system defined agent to access said user's funds, authorized proxy's submission of authorization data for a system defined agent to access said user's funds, said authorized proxy having been authorized by the user, whereby authorization to access the user's online account is provided to a system defined agent, (b) online allocating means to allocate the individual contributions of funds to the shared aggregate group threshold, said allocation selected from the group comprising of transferring funds into a provisional account, holding funds in a user's account, holding funds in a service or good provider's account, transferring funds into a good or service provider account, or verifying financial and authorization data for future movement of funds from a user's account, whereby the system has prepared funds for payment of good and services, whereby said allocation of funds comprises a grouping of users' data into a group profile, whereby a plurality of users' funds are prepared to cover a total group cost of the plurality of users' purchase(s), (c) an event profile editor through which rule developers create definitions for when the allocated funds are moved as a payment transaction for goods and services and, definitions for what acting agent is authorized to initiate the transfer, (d) online transferring means for said users' funds, said funds previously accessed and allocated by the system, said transfer selected from the group comprising of transferring from said provisional account to an account of at least one good or service provider, transferring from said user account to at least one good or service provider, transferring from a good or service provider account back to said user's account, transferring from the holding account to at least one good or service provider whereby the funds are under control of at least one good or service provider, whereby any excess funds are refunded back to a user's account, whereby good and services are paid for, whereby a plurality of users contributions are used towards the shared aggregate group threshold.

2. The method and system of claim 1 wherein a service provider is representing the user that is purchasing goods and services.

3. The method and system of claim 1 wherein a service provider is representing the goods and services provider the user is purchasing from.

4. The method and system of claim 1 wherein the transferring means comprises a sequentially debited amount from a user's account and a credited amount back to the user's account.

5. The method and system of claim 1 wherein the users' data submissions authorize the system to use an agent defined by the system to pay for goods and services using said data when at least one threshold criterion is met, whereby a single agent is responsible for completion of the financial transactions for the plurality of users and, whereby a plurality of users' funds are used to cover a plurality of users' total cost.

6. The method and system of claim 5 further including the user indicating a preferred payment method and data to be used to pay for goods and services when at least one system defined threshold criteria is met.

7. The method and system of claim 6 wherein said data is selected from the group comprising of a minimum dollar amount, a maximum dollar amount, a specific dollar amount or a range of dollar amounts.

8. The method and system of claim 5 wherein said threshold criterion comprises of fund movement when goods and services become available.

9. The method and system of claim 5 wherein said threshold criterion comprises of fund movement when at least one temporal metric is met.

10. The method and system of claim 5 wherein said threshold criterion comprises of fund movement when said system defined agent performs at least one action.

11. The method and system of claim 10 wherein the action is expressed by an agent using a computer interface selected from the group consisting of a input/output peripheral device, a keyboard, a computer mouse, a game playing device, a machine readable label reader, or a biometric reader.

12. The method and system of claim 10 wherein said action is selected from the group comprising of verbally accepting a sale of goods and services, verbally accepting an offer for the reservation of goods and services, accepting a sale of goods and services using a device of a communication network, accepting an offer for the reservation of goods and services using a device of a communication network.

13. The method and system of claim 5 wherein said threshold criterion comprises of fund movement when at least one quality of user data is met.

14. The method and system of claim 5 wherein said threshold criterion comprises of fund movement when a quantity of users submitting data is met.

15. The method and system of claim 5 wherein said threshold criterion comprises of fund movement when a quantity of goods or services being ordered is met.

16. The method and system of claim 5 wherein said threshold criterion comprises of fund moment when at least one quality of a good or service metric is met.

17. The method and system of claim 5 wherein said threshold criterion comprises of fund movement when a quantity of goods or services metric is met.

\* \* \* \* \*